(12) United States Patent
Kobayashi et al.

(10) Patent No.: US 10,415,661 B2
(45) Date of Patent: Sep. 17, 2019

(54) NON-ASBESTOS FRICTION MATERIAL

(71) Applicant: ADVICS CO., LTD., Kariya-shi (JP)

(72) Inventors: Masaaki Kobayashi, Obu (JP); Toshiki Hotta, Kasugai (JP); Masahiro Takezaki, Ama-gun (JP)

(73) Assignee: ADVICS CO., LTD., Kariya-shi (JP)

( * ) Notice: Subject to any disclaimer, the term of this patent is extended or adjusted under 35 U.S.C. 154(b) by 0 days.

(21) Appl. No.: 15/580,165

(22) PCT Filed: Jun. 20, 2016

(86) PCT No.: PCT/JP2016/068226
§ 371 (c)(1),
(2) Date: Dec. 6, 2017

(87) PCT Pub. No.: WO2016/204299
PCT Pub. Date: Dec. 22, 2016

(65) Prior Publication Data
US 2018/0142748 A1  May 24, 2018

(30) Foreign Application Priority Data
Jun. 19, 2015 (JP) ................. 2015-123458

(51) Int. Cl.
*F16D 69/02* (2006.01)
*C09K 3/14* (2006.01)

(52) U.S. Cl.
CPC .............. *F16D 69/026* (2013.01); *C09K 3/14* (2013.01); *F16D 2200/0065* (2013.01)

(58) Field of Classification Search
CPC ......... C09K 3/14; F16D 69/02; F16D 69/026; F16D 2200/0065
See application file for complete search history.

(56) References Cited

U.S. PATENT DOCUMENTS

| | | | |
|---|---|---|---|
| 6,190,761 B1 | 2/2001 | Sasaki et al. | |
| 2001/0024917 A1 | 9/2001 | Ogata et al. | |

FOREIGN PATENT DOCUMENTS

| JP | 03-210338 A | * | 9/1991 |
|---|---|---|---|
| JP | 2000-053945 A | | 2/2000 |
| JP | 2000-191800 A | | 7/2000 |
| JP | 2001-181607 A | | 7/2001 |
| JP | 2005-248012 A | | 9/2005 |

OTHER PUBLICATIONS

International Search Report dated Aug. 16, 2016 in PCT/JP2016/068226, filed on Jun. 20, 2016 (English Translation thereof).

* cited by examiner

*Primary Examiner* — Anthony J Green
(74) *Attorney, Agent, or Firm* — Oblon, McClelland, Maier & Neustadt, L.L.P.

(57) ABSTRACT

Provided is a non-asbestos friction material comprising: base fiber; a binder; a lubricant; an inorganic friction modifier; a pH adjuster; and a filler as compounded materials, wherein at least one of the filler and the inorganic friction modifier is only coated with at least one of a fatty acid and a metal soap.

11 Claims, 3 Drawing Sheets

Fig.3

|  |  |  |  | Examples | | | | | | Comparative Example |
|---|---|---|---|---|---|---|---|---|---|---|
|  |  |  |  | 1 | 2 | 3 | 4 | 5 | 6 | 1 |
| binding composition (wt%) | base fiber | aramid fiber | | 4 | 4 | 4 | 4 | 4 | 4 | 4 |
| | | inorganic fiber (rock wool) | | 6 | 6 | 6 | 6 | 6 | 6 | 6 |
| | binder | phenol resin | | 9 | 9 | 9 | 9 | 9 | 9 | 9 |
| | lubricant | graphite | | 5 | 5 | 5 | 5 | 5 | 5 | 5 |
| | | coke | | 3 | 3 | 3 | 3 | 3 | 3 | 3 |
| | | tin sulfide | | 4 | 4 | 4 | 4 | 4 | 4 | 4 |
| | organic friction modifier | cashew dust | | 5 | 5 | 5 | 5 | 5 | 5 | 5 |
| | | rubber powder (SBR) | | 2 | 2 | 2 | 2 | 2 | 2 | 2 |
| | pH adjuster | calcium hydroxide | | 2 | 2 | 2 | 2 | 2 | 2 | 2 |
| | inorganic friction modifier | potassium titanate | no treatment | 20 | 20 | 20 | 20 | | | 20 |
| | | | stearic acid | | | | | 20 | 20 | |
| | | oxidizing acid | no treatment | 10 | 10 | 10 | 10 | | | 10 |
| | | | stearic acid | | | | | 10 | 10 | |
| | | magnesium oxide | no treatment | 5 | 5 | 5 | 5 | | | 5 |
| | | | stearic acid | | | | | 5 | 5 | |
| | | zirconium silicate | no treatment | 2 | 2 | 2 | 2 | | | 2 |
| | | | stearic acid | | | | | 2 | 2 | |
| | filler | calcium carbonate | no treatment | | | | | | | |
| | | | stearic acid | 8 | | | | 8 | | |
| | | | behenic acid | | 8 | | | | | 8 |
| | | | sorbic acid | | | 8 | | | | |
| | | | zinc stearate | | | | 8 | | 8 | |
| | | barium sulfate | no treatment | | | | | | | 15 |
| | | | stearic acid | 15 | | | | 15 | | |
| | | | behenic acid | | 15 | | | | | |
| | | | sorbic acid | | | 15 | | | | |
| | | | zinc stearate | | | | 15 | | 15 | |
| performance | efficacy | | 50kph | 0.40 | 0.40 | 0.39 | 0.41 | 0.41 | 0.40 | 0.40 |
| | wear according to temperature (pad) | | 100°C | ◎ | ◎ | ◎ | ◎ | ◎ | ◎ | ◎ |
| | | | 200°C | ◎ | ◎ | ◎ | ◎ | ◎ | ◎ | ◎ |
| | | | 300°C | ◎ | ◎ | ◎ | ◎ | ◎ | ◎ | ◎ |
| | | | 400°C | ○ | ○ | ○ | ○ | ○ | ○ | ○ |
| | creep groan evaluation in actual vehicle | after standing overnight | 1st time | ○ | ○ | ○ | ○ | ○ | ○ | × |
| | | | 2nd time | ○ | ○ | ○ | ○ | ○ | ○ | × |
| | | | 3rd time | ○ | ○ | ○ | ○ | ○ | ○ | × |
| | | | 4th time | ○ | ○ | ○ | ○ | ◎ | ◎ | × |
| | | | 5th time | ◎ | ◎ | ○ | ○ | ◎ | ◎ | × |
| | | | 6th time | ◎ | ◎ | ○ | ○ | ◎ | ◎ | × |
| | | | 7th time | ◎ | ◎ | ◎ | ◎ | ◎ | ◎ | △ |
| | | | 8th time | ◎ | ◎ | ◎ | ◎ | ◎ | ◎ | △ |
| | | | 9th time | ◎ | ◎ | ◎ | ◎ | ◎ | ◎ | △ |
| | | | 10th time | ◎ | ◎ | ◎ | ◎ | ◎ | ◎ | △ |
| | | after watering | 1 minute after | ○ | ○ | ○ | ○ | ○ | ○ | × |
| | | | 3 minutes after | ○ | ○ | ○ | ○ | ○ | ○ | × |
| | | | 5 minutes after | ◎ | ◎ | ○ | ○ | ◎ | ◎ | × |

NON-ASBESTOS FRICTION MATERIAL

TECHNICAL FIELD

The present invention relates to a non-asbestos friction material used in a vehicle brake device, for example.

BACKGROUND ART

Conventionally, it is known that uncomfortable abnormal noise, i.e., so-called creep groan (or creep noise) is generated such that, during an operation of an automatic (AT) vehicle, while the vehicle is being stopped by a service brake, in a process of slightly loosening a brake pedal to completely release the brake, a torque is generated in a traveling direction due to creeping to transmit vibration generated by a change in relative speed between a brake pad and a rotor to a suspension system and a vehicle body so as to radiate the vibration. This creep groan is also generated in a manual (MT) vehicle, even when the brake is loosened while the vehicle is being stopped on a downhill slope with the service brake.

During generation of this creep groan, a stick-slip phenomenon occurs between the pad and the rotor. A reduction in energy for generating this stick slip is a major measure to suppress creep groan. Experientially, a reduction in difference between a static friction coefficient and a dynamic friction coefficient of the pad is one example of the countermeasures. The creep groan is likely to occur after rain, after leaving a vehicle unattended in the night, or in an atmosphere at a high absolute humidity and may also be caused by the influence of moisture. However, at present, the fundamental mechanism has not been known.

As a technique for solving the creep groan, for example, one described in Patent Literature 1 is known. In this technique, an amount of moisture present on the friction interface is adjusted by compounding a water absorbing material and a water repellent material (zeolite, antimony oxide, and fluorinated polymer) in the pad in a balanced manner so as to suppress the creep groan.

In addition, Patent Literature 2 discloses a friction material obtained by applying a raw material before molding with surface treatment using a silane-based water repellent material. Patent Literature 3 discloses a friction material containing a water-repellent fluorinated polymer. The techniques of these documents attempt to reduce noise by suppressing an increase in friction coefficient by suppressing moisture absorption and water absorption by a material having water repellency.

CITATION LIST

Patent Literature

Patent Literature 1: Japanese Unexamined Patent Application No. 2001-181607
Patent Literature 2: Japanese Unexamined Patent Application No. 2000-53945
Patent Literature 3: Japanese Unexamined Patent Application No. 2000-191800

SUMMARY OF INVENTION

Technical Problem

However, these techniques leave a room for improvement; they have difficulty in ensuring the effectiveness of braking at high temperatures or require expensive water repellent materials.

An object of the present invention is to provide a non-asbestos friction material capable of reducing an uncomfortable sound called creep groan generated in braking with an inexpensive configuration while ensuring the effectiveness of braking at high temperatures.

Solutions to Problem

In order to solve the above-mentioned problem, a first aspect of the invention provides a non-asbestos friction material including base fiber, a binder, a lubricant, an inorganic friction modifier, a pH adjuster, and a filler wherein at least one of the filler and the inorganic friction modifier is coated with at least one of a fatty acid and a metal soap.

According to the first aspect of the invention, aggregation of wear powder generated by friction between a friction material (for example, brake pad) and a material subjected to friction (for example, disc rotor) is suppressed by a fatty acid or metal soap, and as a result, generation of creep groan is suppressed. Further, in the present configuration, the above effect can be obtained at low cost while securing effectiveness of a brake at high temperatures.

According to a second aspect of the invention, in the first aspect of the invention, it is mainly described that the compounded materials except for the filler and the inorganic friction modifier have portions which are left uncoated.

According to the second aspect of the invention, for example, the effect achieved by the first aspect of the invention can be easily exerted while maintaining high strength and good moldability of the friction material itself.

According to a third aspect of the invention, the melting points of the fatty acid and the metal soap used in the coating are preferably 30° C. or more.

A fourth aspect of the invention provides a method of manufacturing a non-asbestos friction material including base fiber, a binder, a lubricant, an inorganic friction modifier, a pH adjuster, and a filler as compounded materials, wherein at least one of the filler and the inorganic friction modifier is coated in advance with at least one of a fatty acid and a metal soap and then mixed with another compounded material.

According to the fourth aspect of the invention, the compounded materials except for the filler and the inorganic friction modifier have portions which can be easily left uncoated.

BRIEF DESCRIPTION OF DRAWINGS

FIG. 3 is a diagram obtained by summarizing compositions and performance evaluations of raw materials of friction materials of Examples and Comparative Examples.

DESCRIPTION OF EMBODIMENTS

Figure 1:
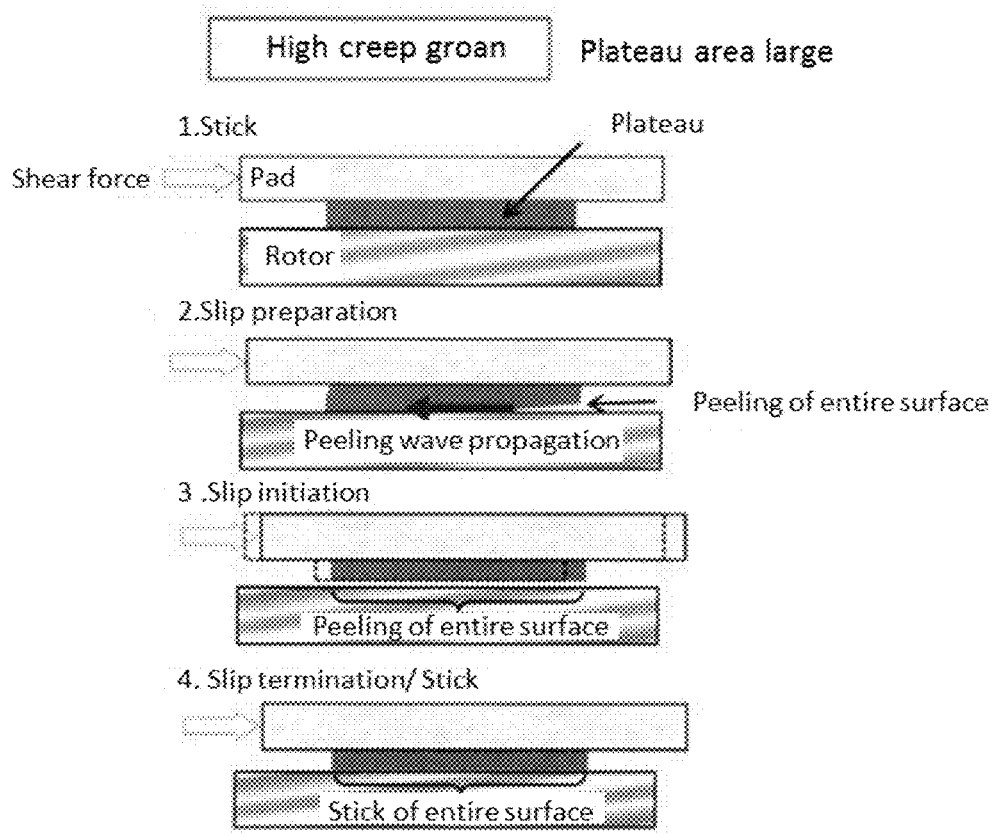
FIG. 1 is a diagram for explaining a stick-slip phenomenon of a non-asbestos friction material according to the embodiment (when creep groan is high).

Hereinafter, an embodiment of the present invention will be described in detail. However, the present invention is not limited by the following embodiment unless the description departs from the spirit and scope of the invention.

1. Friction Material

One embodiment of a friction material according to the present invention will be described below in detail. A non-asbestos friction material of the present embodiment includes base fiber, a binder, a lubricant, an inorganic friction modifier, a pH adjuster, and a filler.

Here, as the base fiber, organic fiber, metal fiber, natural or artificial inorganic fiber can be mentioned. Specifically, organic fibers are exemplified by aromatic polyamide fiber (aramid fiber) and acrylic fiber, and metal fibers are exemplified by steel fiber, stainless steel fiber, metal fibers made of single metals such as copper, zinc, and tin, and metal fibers made of alloy metals of the single metals. As these fibers, fiber of one type or fibers of two or more types may be used.

As the binder, a phenol resin, an epoxy resin, an imide resin, and the like can be given. Modified resins such as elastomers, hydrocarbon resins and epoxies can also be used.

As the lubricant, for example, graphite, a metal sulfide (antimony trisulfide, molybdenum disulfide, tin sulfide, and the like), coke, carbon black, and the like can be given.

As organic friction modifiers, for example, cashew dust and rubber powder can be given. As the pH adjusters, a calcium hydroxide, for example, can be given.

As the inorganic friction modifiers, for example, ceramic powder, metal powder, metal oxide powder (such as iron oxide), a potassium titanate, a magnesium oxide, a magnesium carbonate, mica, talc, zirconia, a zirconium silicate, a calcium silicate, and the like can be given. As the fillers, for example, a calcium carbonate and a barium sulfate can be given.

As described above, it is known that creep groan can be generated in braking in a friction material containing the materials so as to pose a problem in which the noise makes a driver of the vehicle uncomfortable. As a result of intensive research, the present inventors have found the mechanism of occurrence of a stick-slip phenomenon between a friction material (for example, a brake pad) and a material subjected to friction (for example, a disc rotor), which can be given as a cause of generating creep groan.

In more detail, they have found that the behavior of aggregated products (plateau) of wear powder generated by friction between the friction material and the material subjected to friction affects this stick-slip phenomenon. That is, the wear powder repeatedly aggregates and breaks on a friction surface between the friction material and the material subjected to friction and is gradually eliminated. At that time, the aggregations and the breaks cause a fluctuation in brake torque. Particularly, when the plateau is broken to peel from the rotor serving as, for example, a non-friction material, a loss of a brake torque occurs to cause a stick-slip phenomenon. When braking and elimination are repeated when the plateau slightly grows, a fluctuation in torque and a stick slip are small. However, when the plateau largely grows, a loss of brake torque also becomes large when the plateau is broken, so that the stick slip consequently becomes large.

This will be described below with reference to FIG. 1 and FIG. 2. As shown in FIG. 1, when a plateau largely grows, in a "2. Slip preparation" state in the middle of transition from a "1. Stick" state in which the entire surface of the plateau is stuck to the rotor to a "3. Slip initiation" state in which the entire surface of the plateau is peeled from the rotor, since the area of the plateau is large, a peeling wave generated at the start of peeling becomes large, the stick slip becomes large accordingly, and creep groan becomes high.

Figure 2:
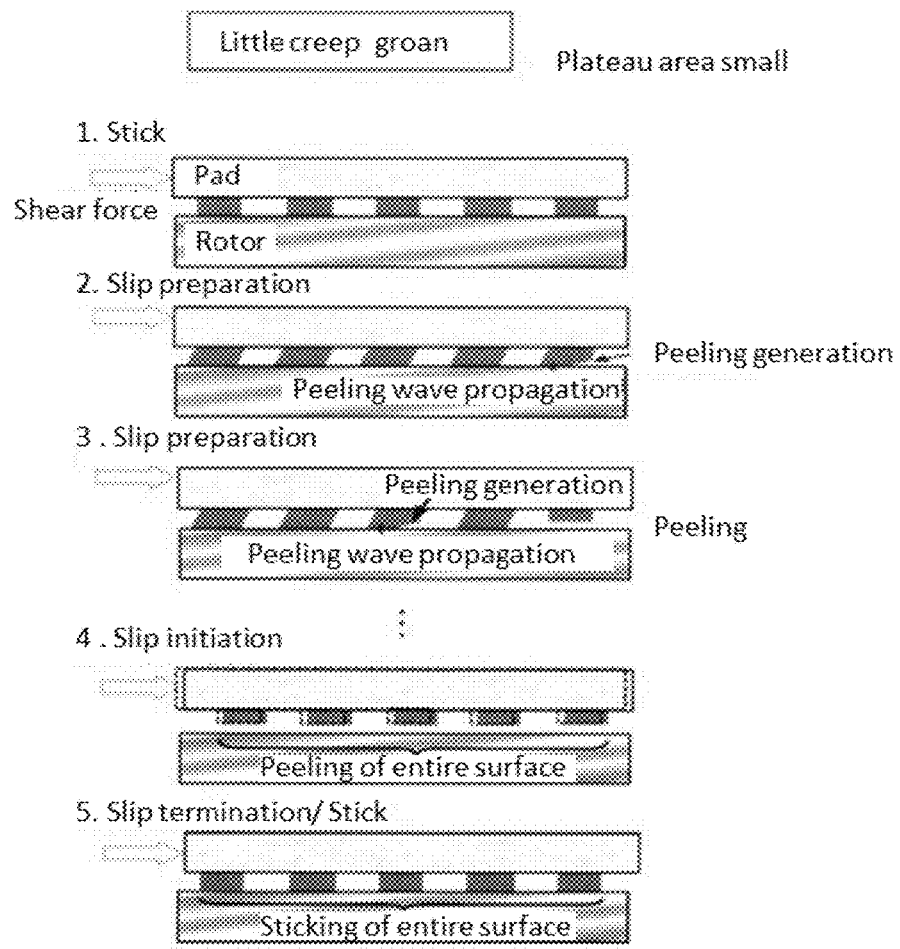
FIG. 2 is a diagram for explaining a stick-slip phenomenon as well (when creep groan is small).

On the other hand, as shown in FIG. 2, when the plateau is relatively small, since the peeling wave generated in the "2. Slip preparation" state becomes relatively small, the stick slip becomes small accordingly, and the creep groan becomes small.

That is, difficulty in aggregating the wear powder makes stick-slip generation energy small. As a result, the creep groan can be suppressed. Since the wear powder is powder, the wear powder tends to aggregate through moisture, an agglomerate largely grows in an atmosphere at a high absolute humidity after rain or after leaving a vehicle unattended in the night, and creep groan is more likely to occur.

The present inventors focused on this point, continued research, and found that wear powder aggregation can be suppressed by coating at least one of a fatty acid and a metal soap on at least one of a filler and an inorganic friction modifier in compounded materials of a friction material. Fatty acids and metallic soaps have lubricity as its properties, which exert an effect on resistance to blocking of powder.

The fatty acid used in the present invention may be a saturated fatty acid or an unsaturated fatty acid. However, fatty acids having a melting point of 30° C. or more are preferable in consideration of the storage stability of the coated raw materials and the handleability in manufacturing.

As the saturated fatty acids, lauric acid, tridecylic acid, myristic acid, pentadecylic acid, palmitic acid, margaric acid, stearic acid, nonadecylic acid, arachidic acid, behenic acid, and the like can be exemplified. As the unsaturated fatty acids, elaidic acid, nervonic acid, erucic acid, sorbic acid, and the like can be exemplified.

On the other hand, as the metal soaps, metal soaps produced by using a fatty acid such as stearic acid, lauric acid, or ricinoleic acid and a metal such as lithium, magnesium, calcium, barium, or zinc can be given. More specifically, lithium stearate, magnesium stearate, calcium stearate, barium stearate, zinc stearate, calcium laurate, barium laurate, zinc laurate, calcium ricinoleate, barium ricinoleate, zinc ricinoleate can be given.

As a coating method, a general method may be used. Each raw material to be coated may be individually stirred with a stirrer heated to a temperature equal to or higher than the melting point of fatty acid or metal soap, or the raw materials to be coated may be stirred all at once.

Note that the compounded materials of the friction material except for the filler and the inorganic friction modifier desirably have portions which are left uncoated. For example, the uncoated portion is left on the base fiber to make it possible to easily maintain the strength of the friction material itself at a high level. In addition, the uncoated portion is left on the binder to make it possible to easily maintain preferable moldability. The lubricant has a preferable lubricating function which can be easily maintained, and the pH adjuster has preferable rust adhesion preventing performance which can be easily maintained.

As the manufacturing method in which the uncoated portions are left on the compounded materials of the friction material except for the filler and the inorganic friction modifier, a method in which raw materials of the filler and the inorganic friction modifier are coated and the coated raw materials of the filler and the inorganic friction modifier are mixed with uncoated raw materials of the other compounded materials of the friction material is preferably used.

The coating is preferably applied to relatively fine particles. Since fine particles tend to aggregate, prevention of the aggregation leads to achievement of a preferable creep groan suppressing effect.

As described above, the friction material of the present invention can be applied to, for example, a pad for a disk brake of vehicle or the like. However, the application is not limited to the pad for vehicle. For example, the friction material can be applied to conventionally known friction materials such as brake shoes for drum brake.

2. Method of Manufacturing Friction Material

An embodiment of a method of manufacturing a friction material according to the present invention will be described below. In the method of manufacturing a friction material according to the embodiment, the raw materials of the above-described compounded materials are mixed for 10 minutes by a Loedige mixer, and the mixture is pressured, heated, and molded under the conditions of a molding temperature of 160° C., a molding pressure of 200 kgf/cm$^2$, and a molding time of 10 minutes, and the molded product is cured at 200° C. for 4 hours. As described above, at least one of the filler and the inorganic friction modifier is coated with at least one of a fatty acid and a metal soap in advance, and then mixed with raw materials of other compounded materials.

EXAMPLES

Hereinafter, the present invention will be specifically described with reference to examples. However, the present invention is not limited to the examples.

In the examples, raw materials of a friction material were blended according to compounding amounts shown in FIG. 3 to obtain compositions of friction materials according to Examples 1 to 6 and Comparative Example 1. The unit of the compounding amount of the raw materials of each friction material in the table is weight % with respect to all the compositions of the friction material. "No treatment" described on the right side of the raw material name in each column of the inorganic friction modifier column and filler column indicates that the coating is not applied, and a name of fatty acid or metal soap described below the "no treatment" is the name of a material used in the coating (one with the numerical value (% by weight) described in each example column is used for coating). The compositions of the friction material was mixed with each other, pressured, heated, and cured as described above.

The manufactured friction materials of Examples 1 to 6 and Comparative Example 1 were evaluated with respect to the following items.
(Average Friction Coefficient (Efficacy))

According to JASO C406, in an environment at 23° C. and a humidity of 65%, the average friction coefficient at a pre-braking speed of 50 km/h in a second efficacy test was measured.
(Wear Volume According to Temperature)

An abrasion test was performed at each temperature according to JASO C427, a wear volume (mm) of the friction material was measured, and the wear volume was converted into a wear volume per 1,000 braking counts. Thereafter, the wear volume was evaluated at four levels indicated by ⊚: less than 0.20 mm, ○: 0.20 mm or more and less than 0.25 mm, Δ: 0.25 mm or more and less than 0.30 mm, and x: 0.30 mm or more.
(Creep Groan Test)

By using an actual vehicle, rubbing equivalent to JASO C406 was executed, and the friction materials were left outdoors overnight. Thereafter, a comparison test of sound pressure levels of creep groan was executed. The creep groan was evaluated by gradually loosening the brake pedal at a pad surface pressure of 1.0 MPa while the vehicle was in a stop state, maintaining a depressing force of the brake pedal when the vehicle began to move, and measuring creep groan generated at this time with a sound-level meter. This procedure was repeated ten times. Evaluation criteria are as follows. More specifically, ⊚: no abnormal sound is generated at all, ○: abnormal sound is generated, but a faint sound pressure, Δ: abnormal sound is generated, but a sound pressure is at an allowable level, and x: abnormal sound is generated and a sound pressure is uncomfortable level.

Immediately after water was flowed on a caliper back portion with a hose for 30 seconds upon completion of the above-mentioned standing test, a creep groan evaluation was performed a total of 4 times: 0, 1, 3, and 5 minutes after.

The results are shown in FIG. 3. In each of Examples 1 to 6 of the present invention, good results were obtained in terms of the average friction coefficient (efficacy), the wear volume according to temperature, and the creep groan. In this manner, it was found that at least one of the inorganic friction modifier and the filler is coated on at least one of the fatty acid and the metal soap to make it possible to obtain the friction material excellent in average friction coefficient (efficacy), wear volumes according to temperature, and creep groan suppression. In contrast to this, in Comparative Example 1 in which the coating was not applied, the creep groan test result was inferior. For this reason, it becomes clear that the creep groan suppressing performance confirmed in the examples of the present invention is brought about by the coating.

INDUSTRIAL APPLICABILITY

The friction material and the method of manufacturing a friction material according to the present invention can be applied to a product such as a disk brake pad or a brake shoe for a vehicle or the like which requires a conventionally known friction material.

The invention claimed is:

1. A non-asbestos friction material comprising:
   base fiber;
   a binder;
   a lubricant;
   an inorganic friction modifier;
   a pH adjuster; and
   a filler as compounded materials,
   wherein at least one of the filler and the inorganic friction modifier is only coated with a fatty acid, and
   wherein the base fiber, the binder, the lubricant, the inorganic friction modifier, the pH adjuster, and the filler are made of different materials.

2. The non-asbestos friction material according to claim 1, wherein the compounded materials except for the filler and the inorganic friction modifier have portions which are left uncoated.

3. The non-asbestos friction material according to claim 1, wherein the fatty acid used in the coating has a melting point of 30° C. or more.

4. The non-asbestos friction material according to claim 2, wherein the fatty acid used in the coating has a melting point of 30° C. or more.

5. The non-asbestos friction material according to claim 1, wherein the pH adjuster is calcium hydroxide.

6. The non-asbestos friction material according to claim 1, wherein the lubricant is selected from the group consisting of graphite, a metal sulfide, coke, and carbon black.

7. The non-asbestos friction material according to claim 1, wherein the inorganic friction modifier is selected from the group consisting of ceramic powder, metal powder, metal oxide powder, a potassium titanate, a magnesium oxide, a magnesium carbonate, mica, talc, zirconia, a zirconium silicate, and a calcium silicate.

8. The non-asbestos friction material according to claim 1, wherein the non-asbestos friction material further includes cashew dust as an organic friction modifier.

9. A non-asbestos friction material comprising:
base fiber;
a binder;
a lubricant;
an inorganic friction modifier;
a pH adjuster; and
a filler as compounded materials,
wherein the non-asbestos friction material includes a calcium carbonate as the filler and the calcium carbonate is only coated with at least one of a fatty acid and a metal soap,
wherein the non-asbestos friction material includes a calcium hydroxide as the pH adjuster not coated with either the fatty acid or the metal soap, and
wherein the base fiber, the binder, the lubricant, the inorganic friction modifier, the pH adjuster, and the filler are made of different materials.

10. The non-asbestos friction material according to claim 9, wherein the lubricant is graphite.

11. The non-asbestos friction material according to claim 9, wherein the non-asbestos friction material further includes cashew dust as an organic friction modifier.

* * * * *